US008178068B2

(12) United States Patent
Axon et al.

(10) Patent No.: US 8,178,068 B2
(45) Date of Patent: May 15, 2012

(54) CATALYST CHARGE DESIGN

(75) Inventors: Sean Alexander Axon, Cleveland (GB);
Duncan Roy Coupland, High Wycombe (GB); Brian Thomas Horner, Cambridgeshire (GB); John Ridland, County Durham (GB); Ian Carmichael Wishart, Oxon (GB)

(73) Assignee: Johnson Matthey PLC, London (GB)

( * ) Notice: Subject to any disclaimer, the term of this patent is extended or adjusted under 35 U.S.C. 154(b) by 694 days.

(21) Appl. No.: 10/554,982

(22) PCT Filed: Apr. 27, 2004

(86) PCT No.: PCT/GB2004/001783
§ 371 (c)(1),
(2), (4) Date: Oct. 2, 2006

(87) PCT Pub. No.: WO2004/096702
PCT Pub. Date: Nov. 11, 2004

(65) Prior Publication Data
US 2007/0031314 A1   Feb. 8, 2007

(30) Foreign Application Priority Data
Apr. 29, 2003  (GB) .................................. 0309747.4
Jul. 4, 2003    (GB) .................................. 0315643.7

(51) Int. Cl.
*C01B 21/26*  (2006.01)
(52) U.S. Cl. ........ 423/403; 423/356; 423/375; 423/392; 423/395; 423/396; 423/397; 423/398; 423/402; 423/404; 502/302; 502/303; 502/304; 502/326; 502/329; 502/339; 502/340; 502/341; 502/342; 502/343

(58) Field of Classification Search .................. 423/356, 423/395–398, 402–404, 375, 392; 502/302–304, 502/326, 329, 339, 340–343
See application file for complete search history.

(56) References Cited

U.S. PATENT DOCUMENTS

| 4,774,069 | A | * | 9/1988 | Handley ........................ 423/403 |
| 5,296,435 | A | * | 3/1994 | Kitaguchi et al. ............ 502/174 |
| 5,985,230 | A | * | 11/1999 | Vlaming et al. .............. 423/392 |
| 6,451,278 | B1 | * | 9/2002 | Zolotarsky et al. ........... 423/403 |
| 6,743,404 | B1 | | 6/2004 | Schumacher et al. | |

(Continued)

FOREIGN PATENT DOCUMENTS

EP   0 275 681 A1   7/1988
(Continued)

OTHER PUBLICATIONS

Gang et al., NH3 oxidation to nitrogen and water at low temperatures using supported transition metal catalysysts, 2000, Catalysis Today, 61, 179-185.*

(Continued)

*Primary Examiner* — Jerry Lorengo
*Assistant Examiner* — Pritesh Darji
(74) *Attorney, Agent, or Firm* — RatnerPrestia

(57) ABSTRACT

A catalyst charge for ammonia oxidation, including the Andrussow process, comprises a first stage ammonia oxidation catalyst capable of oxidizing 20 to 99% of designed ammonia throughput, to produce a first stage product gas comprising unreacted ammonia, oxygen and nitrogen oxides, and a second stage ammonia oxidation catalyst capable of completing the oxidation of unreacted ammonia. Low levels of nitrous oxide are produced an extended campaign lengths may be seen.

13 Claims, 1 Drawing Sheet

U.S. PATENT DOCUMENTS

| | | |
|---|---|---|
| 2003/0124046 A1 | 7/2003 | Gorywoda et al. |
| 2003/0133849 A1* | 7/2003 | Schumacher et al. ........ 422/172 |
| 2004/0105803 A1 | 6/2004 | Schwefer et al. |
| 2004/0179986 A1 | 9/2004 | Burckhardt et al. |

FOREIGN PATENT DOCUMENTS

| | | |
|---|---|---|
| EP | 0 611 041 A1 | 8/1994 |
| EP | 0 835 686 A2 | 4/1998 |
| EP | 0 835 686 A3 | 4/1998 |
| GB | 1 347 491 | 2/1974 |
| JP | 05058607 A * | 3/1993 |
| RU | 2 186 724 C1 | 8/2002 |
| SU | 1636332 A1 | 3/1991 |
| WO | WO-98/28073 A1 | 7/1998 |
| WO | WO-99/55621 A1 | 11/1999 |
| WO | WO-99/64352 A1 | 12/1999 |
| WO | WO-00/13789 A1 | 3/2000 |
| WO | WO-01/51415 A1 | 7/2001 |
| WO | WO-01/87771 A1 | 11/2001 |
| WO | WO-03/011448 A1 | 2/2003 |

OTHER PUBLICATIONS

Li at al., Selective NH3 oxidation to N2 in a wet stream, 1997, Applied Catalysis B: Environmental, 13, 131-139.*

Petryk et al, Cobalt oxide catalysts for ammonia oxidation activated with cerium and lanthanum, 2000, Applied Catalysis B: Environmental, 24, 121-128.*

M. M. Karavaev, Ed., "Catalytic Oxidation of Ammonia" (Moscow, 'Chemistry' Publishing House, 1983), pp. 14-15, 30-31, and 137-141.

V. I. Astroschenko, Ed., "Technology of Fixed Nitrogen" (Charkov State University Publishing House, 1962), pp. 311-313.

V. I. Astroschenko and S. I. Kargin, Eds., "Technology of Nitric Acid" (Moscow 'Chemistry' Publishing House, 1970), pp. 35-36.

Chemical Abstracts 114:188430, May 20, 1991.

* cited by examiner

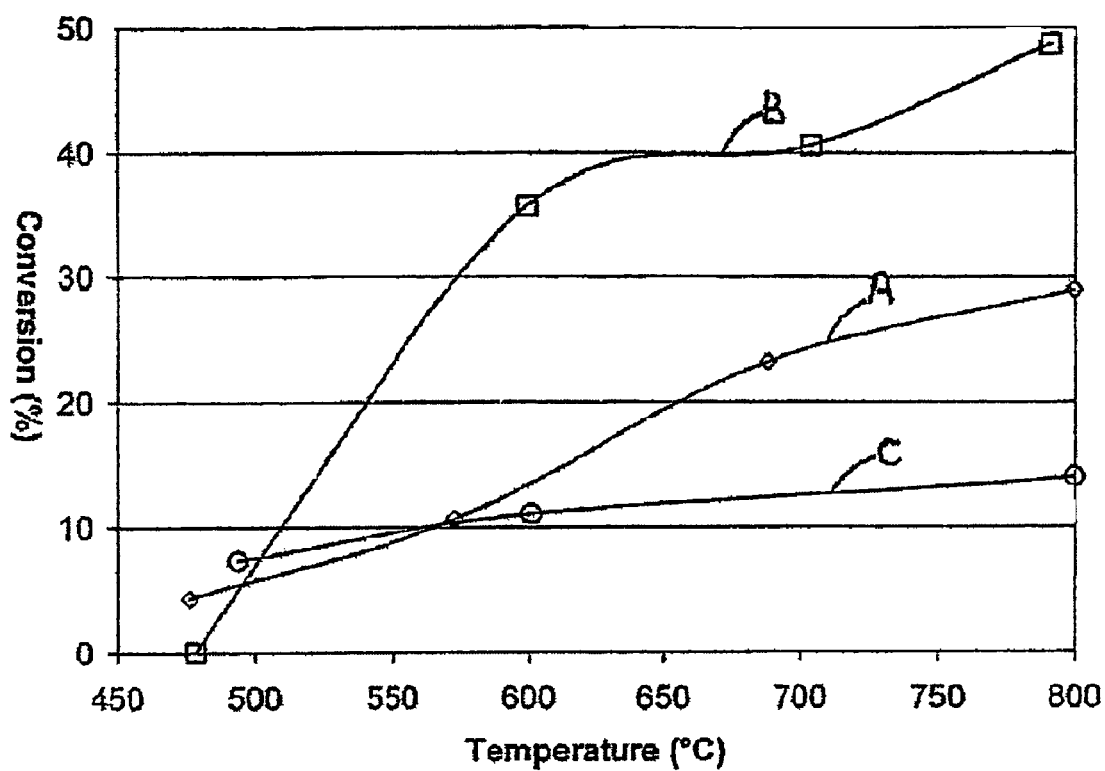

CATALYST CHARGE DESIGN

This application is the U.S. National Phase application of PCT International Application No. PCT/GB2004/001783, filed Apr. 27, 2004, and claims priority of British Patent Application No. 0309747.4, filed Apr. 29, 2003, and British Patent Application No. 0315643.7, filed Jul. 4, 2003.

FIELD OF THE INVENTION

The present invention concerns an improved catalyst charge design, suitable for an ammonia oxidation process. More particularly, it concerns a two- or multi-stage catalyst charge, which is believed to offer technical and economic advantages.

BACKGROUND OF THE INVENTION

The oxidation of ammonia using air to form nitric oxide for nitric acid production, for nitrate fertilisers or explosives, has been established since the early $20^{th}$ Century (the Ostwald process), and is in widespread use across the world. The established process uses a platinum or platinum alloy gauze as catalyst for the reaction of ammonia with the oxygen in air. The Andrussow process for the production of hydrogen cyanide uses essentially similar technology, and should be considered as being within the scope of the present invention. The Pt gauze is usually supplied as a "pack" of several gauzes mounted one above the other. Successive gauzes may vary in filament thickness, alloy composition, and in other ways.

During operation, platinum is lost physically or by volatilisation from the gauzes, to a greater or lesser extent depending upon the process conditions, e.g. pressure. Whilst the platinum may collect in cooler parts of the plant, recovery of the platinum can prove difficult. It is known to include one or more "catchment" or "getter" gauzes, which are palladium (Pd)-based, which are mounted closely downstream of the catalyst gauzes. The catchment gauzes collect a high proportion of the Pt lost, although a proportion of the Pd is itself simultaneously displaced from the catchment gauze. Instead of having a separate Pd catchment gauze, it is possible to incorporate Pd filaments in a second or third gauze. It has been suggested that in such a case, the Pt recovered continues to be available to act as a catalyst. Recent research work by the Applicants indicates strongly, however, that Pd gauzes may increase $N_2$ and/or $N_2O$ levels compared to a Pt gauze, up to several times. One mechanism may be:

It is not presently known whether $N_2$ and $N_2O$ generation is the result of incomplete oxidation of residual ammonia or by reaction of residual ammonia with NOx, but indications are that residual ammonia is undesirable. Also undesirable, because of the effect on overall yield of NO and $NO_2$, is either loss of NO, for example by the above reaction, or conversion of ammonia or NOx to $N_2$.

There have been few advances in the Pt gauze-based technology over the last 20 years, apart from the development and introduction of knitted gauzes, in place of woven gauzes, by the present Applicants.

The substantial capital cost of Pt gauzes has led to some exploration of base metal catalysts for ammonia oxidation. These catalysts are generally based upon cobalt compounds such as Co oxides or perovskites. However, although the best Co perovskite catalysts offer some technical advantages over Pt-based gauze catalysts in addition to the lower capital cost, it appears that sufficient disadvantages remain, primarily a significant sensitivity to poisoning from atmospheric sulphur compounds, so that there has been only very limited commercial scale applications, in the manner of trials, as far as is presently in the public domain.

There have been a few proposals to combine platinum gauze with a Co-containing material. For example, Chemical Abstracts 114:188430 describes the combination of 1-2 Pt grids with a downstream $Co_3O_4$ catalyst. Such a catalyst is stated to show maximum selectivity to NO formation at 350° C., which is very much lower than the operating temperature of a conventional Pt gauze catalyst, and hence lower than the normal operating temperature of ammonia oxidation plants. Low temperatures are necessary for $Co_3O_4$ catalysts because of a phase change they are known to undergo above 850° C. resulting in the formation of CoO which has lower selectivity for NO in the ammonia oxidation process. Furthermore, no reference was made to the resulting $N_2O$ levels. WO 99/64352 describes a platinum gauze catalyst followed by a Co-containing catalyst, where a reduction in side reactions; such as nitrous oxide formation, is claimed. However the combined catalyst system only demonstrated at best $N_2O$ levels of 700 ppm in laboratory apparatus. This patent application was abandoned, and we are not aware of any commercialisation of the technology. Indeed, platinum or platinum alloy gauzes remain the only commercially available and technically acceptable technology in the marketplace.

The gauze manufacturers design gauze packs individually for each plant, or for each burner on a plant. It is state of the art practice that pack design aims for maximum conversion possible under the plant operating conditions, since there is a gradual fall-off of conversion efficiency as the platinum gauze deteriorates in use. Eventually, when conversion drops to unacceptable levels, the plant campaign is terminated and the catalyst is replaced. It would therefore be counter-intuitive to design a catalyst pack or catalyst charge where the conversion over a first platinum group metal catalyst element is deliberately chosen to be less than complete. Since incomplete conversion results in residual ammonia in the gas stream, the opportunity to make $N_2O$ by side reactions is likely to be increased. Indeed, loss of yield is established in the art as being very important; ammonia slip can cause the side reaction yielding $N_2$, which clearly causes loss of yield, and ammonia slip also raises the possibility of forming explosive ammonium nitrate downstream of the catalyst.

SUMMARY OF THE INVENTION

There remains a need for improved choices for the ammonia oxidation plant operator, and for the catalyst charge designer, not least because of the capital cost of a platinum or platinum-alloy gauze catalyst, combined with the losses of valuable platinum from the catalyst in use. We consider that the objectives of the present invention, one or more of which we believe are satisfied in the preferred embodiments and when operating under preferred conditions, may be stated as:— high ammonia conversion with low $N_2O$ make;
provide similar or improvements in one or more of pressure-drop, yield and lifetime ("campaign length");
possibility of reduced platinum group metal inventory; and
improved operation during start-up and shut-down events.

Hereinafter, sometimes the abbreviation "PGM" is used for "platinum group metals".

Accordingly, the present invention provides a process for the oxidation of ammonia, including the Andrussow process, comprising passing a feed gas comprising a source of ammonia (eg, ammonia itself or offgas from a urea plant) together with a source of oxygen over a catalyst, and operating at temperatures of from 700 to 1000° C., characterised in that the feed gas is passed over a first stage catalyst for ammonia oxidation comprising a high surface area platinum group metal catalyst to yield a first stage product comprising nitrogen oxides, oxygen and unreacted ammonia and a source of oxygen and which first stage product is used in combination with a second stage catalyst for ammonia oxidation, and in that ammonia oxidation is not completed during passage of the feed gas over the first stage catalyst, but is completed during passage of the first stage product over the second stage catalyst, to yield a second stage product. Under preferred operating conditions, there is insignificant ammonia slip from the second stage catalyst combined with low $N_2O$ make, in the second stage product.

It will, of course, be understood that the first and second stage catalysts are not identical.

It is envisaged that the process of the invention can, under ideal conditions, offer increased campaign life. Other potential advantages of the present invention include reduced operating costs due to reduced precious metal costs, and improved environmental performance arising from reduced overall emissions of process by-products.

The invention in a second aspect provides a method of designing a catalyst charge for the oxidation of ammonia, including the Andrussow process, for a particular feedstock comprising ammonia and a source of oxygen, comprising incorporating a first, upstream, catalyst for ammonia oxidation comprising a high surface area platinum group metal catalyst in sufficient quantity and in adequate physical arrangement to oxidise an incomplete quantity, from 20% up to 99%, of the ammonia in the feedstock, to generate a designed first stage product containing nitrogen oxides, residual ammonia and a source of oxygen, and incorporating a second ammonia oxidation catalyst to be installed downstream of the first catalyst, which second catalyst is present in excess of the quantity and physical arrangement to oxidise the residual ammonia in the designed first stage product. In a preferred embodiment, the catalyst charge is designed to ensure that a second stage catalyst is used with significant $N_2O$ destruction activity, and the temperature within the second stage is in excess of that at which 50% $N_2O$ is destroyed, preferably greater than 80% of $N_2O$ is destroyed, more preferably, greater than 90% is destroyed.

The invention also provides a catalyst charge for ammonia oxidation, designed in accordance with the second aspect of the invention. In a further aspect, the invention provides the use of the catalyst charge in a high yield extended campaign ammonia oxidation process. High yield and extended campaign are each relative to a conventional, state-of-the-art, Pt or Pt alloy gauze catalyst pack.

Catalyst charges according to the invention desirably are direct replacements for the convention gauze packs. Depending upon the burner size and handling requirements, they may be constructed as a single charge unit, or in sections, e.g. quadrants, hinged or linked quadrants, or the like. Desirably, the catalyst charges, whether single charge units or divided in some way, comprise all the components in an integral manner.

BRIEF DESCRIPTION OF THE DRAWINGS

FIG. 1 is a graph showing percent conversion of $N_2O$ as a function of temperature for samples A, B, and C.

DETAILED DESCRIPTION OF THE INVENTION

It should be understood that in defining first and second stage catalysts, the invention includes variations, such as the inclusion of one or more other layers before, interposed between or after the essential two catalyst layers, even where such other layer(s) has a catalytic effect.

An advantage of the present invention is that conventional plant operating parameters, such as pressure, pre-heat and throughput ("load") do not need to be altered in order to obtain at least some of the advantages of the present invention. Desirably, the Gas Hourly Space Velocity "GHSV") for the total first and second stage catalysts is of the order of 100,000 $hr^{-1}$, suitably from 50,000 to 200,000 $hr^{-1}$.

A suitable design of first stage catalyst provides for from 20 to 99% conversion under normal operating conditions, preferably 60 to 99% conversion, more preferably >75%, particularly 50 to 70%, although in some embodiments it may be desirable to convert 85 to 95% of the ammonia over the first stage. The invention desirably provides a second stage product comprising less than 1600 ppm $N_2O$, preferably less than 600 ppm, more preferably less than 500 ppm, for example in the range 100 to 200 ppm, $N_2O$. In the case where either the second stage catalyst is particularly active for $N_2O$ destruction, or where there is a separate, downstream $N_2O$ destruction catalyst, we have discovered that many of the gas components in a process of ammonia oxidation actually inhibit $N_2O$ destruction. Therefore, it is important to carry out representative tests before selecting such catalysts.

In all aspects of the invention, the first stage catalyst is a high surface area platinum group metal ammonia oxidation catalyst, preferably Pt or a Pt alloy such as Pt5Rh or Pt10Rh, or other conventional Pt alloy. The actual alloy chosen is not critical to the present invention, and it may comprise other alloying components, for example Co or Ir. The Pt or Pt alloy may be in filamentary form, such as drawn filaments or wires, conveniently as a knitted or a woven gauze, or may be in ribbon form and/or as a non-woven layer. Successive gauzes or layers may comprise different alloys or metals, mixtures of different alloys or metals and/or different size filaments. Such gauzes or layers may be readily manufactured in conventional manner. The first stage catalyst may be or comprise a "pad" of knitted gauze, prepared by three-dimensional knitting to give enhanced thickness, with loops of filaments extending through the depth of the pad.

However, the present invention includes alternative high surface area, low pressure drop catalysts, where the catalytic Pt or Pt alloy is supported on a base metal or ceramic support, which may be filamentary, in bead or shaped form, in the form of a metal or ceramic foam or in monolith form such as a metal or ceramic honeycomb, grid, static mixer or the like. The Pt or Pt alloy catalyst may be itself supported on oxidic particles, or may be deposited onto an oxidic coating on the metal or ceramic support. Such oxidic particles or supports are well established in catalyst technology. Such supported catalysts may offer advantages in campaign length compared to gauze catalysts, where the structural integrity of the gauze may be quite badly affected by loss of Pt from the filaments.

A deposition route of possible interest for Pt and Pt alloys onto supports such as ceramics or metals comprises combustion flame spraying or vacuum or air plasma spraying, which yields a high surface area, porous deposited layer. Other, conventional, techniques for depositing a precious metal salt or complex onto a support and firing or reducing to yield a metal may of course be used. The metal spray technique may be used to deposit a high surface area Pt layer onto a Pt or Pt alloy gauze; such a layer may further improve catalyst light-off for process start-up.

The invention permits a reduction in the total mass of Pt or Pt alloy used for a given design duty. Such "thrifting" of precious metal may have significant economic value to the plant operator. In particular, where the second stage ammonia oxidation catalyst is a bed of particulate lanthanum-cerium cobaltate catalyst as described in WO 98/28073, we have found that it is possible to replace >20%, preferably >30% and most preferably >40% by weight of platinum alloy gauzes used before inclusion of the cobaltate catalyst in the catalyst assembly without significant loss in NO efficiency whilst reducing nitrous oxide levels to below 50% of that obtained before inclusion. However, certain preliminary studies also suggest that particular advantages may result from the use of Pt or Pt alloy in an amount up to 90% of the weight of a traditional gauze only catalyst pack, with a relatively small quantity of second stage catalyst.

The second stage catalyst may be selected from a wide variety of catalysts. In one aspect, the second stage catalyst may be a platinum group metal catalyst, which may be supported, such as a Rh- and/or Ir-based catalyst, or may be or comprise a base metal or base metal oxide, especially where the base metal is a transition metal or a rare earth metal, and may, for example, comprise one or more of iron, nickel, copper, cobalt, manganese, or be or comprise silver, or supported platinum, palladium or ruthenium. The second catalyst may be a mixture of one or more base metals with one or more precious metals. For example, initial trials indicate that a Rh catalyst dispersed and supported on a shaped catalyst support, can be effective to complete the oxidation of residual ammonia, whilst at the same time reducing unwanted side reactions. Although such a Rh catalyst may comprise other components or promoters, such as other platinum group metal catalysts, initial indications are that such a second stage catalyst is preferably free of catalytic or promoting components, and consists essentially of Rh on its support.

Catalysts suitable to be considered for the second stage catalyst include Cobalt-containing and non-Cobalt-containing ammonia oxidation catalysts and mixtures of these. Included within these are Au, supported PGM catalysts, $La_2O_3$, $CO_3O_4$ optionally with minor quantities of $Li_2O$, certain spinels such as $CoAl_2O_4$, certain substituted $ABO_3$ materials, certain perovskites such as $LaCoO_3$, including $LaCoO_3$ in which partial substitution (e.g. up to 20 mole %) of the A-site has been made by e.g. Sr or Ce, or partial substitution (e.g. up to 50 mole %) of the B-site has been made by e.g. Cu), $La_2CoO_4$, $CO_3O_4$ supported on alumina, thoria, ceria, zinc oxide or calcium oxide, $CO_3O_4$ or $Bi_2O_3$ promoted by rare earth elements or thorium and optionally containing one or more of oxides of Mn, Fe, Mg, Cr or Nb, $CoO_x$ with Pt on a support.

The second stage catalyst may be a Co-containing ammonia oxidation catalyst, especially a mixed Co and one or more rare earth oxides, most preferably as described in WO 98/28073.

In the case of a supported catalyst, this may be prepared in conventional manner, generally incorporating impregnation and firing steps. Such a supported catalyst may carry catalyst dispersed throughout the support, or may be loaded on a surface skin or in or around pores. However, it is not believed that catalyst deposition methods are critical to the present invention. We wish to mention the possibility of depositing metals, especially platinum group metals, by metal spraying using a combustion flame spraying process, or using vacuum or air plasma spraying. Such methods may deposit high surface area (porous) metal layers onto ceramic or even metal catalyst supports. Similar technology may be used to deposit base metal oxides, particularly when spraying is in the presence of oxygen or air.

Suitable catalyst loadings may be established by experiment for the particular conditions, but for platinum group metals (of which Rh is the metal of choice) are generally from 0.1 to 10% by weight, more usually from 0.3 to 5% by wt, most suitably from 0.5 to 1.5 by wt and for base metals are generally from 1 to 20 wt %, more usually from 5 to 15 wt %. Base metal catalysts may comprise minor amounts of promoters.

The catalyst supports may be any refractory metal or ceramic support offering adequate surface area combined with low pressure drop. Suitable metal supports include heat resistant stainless steels, which may incorporate passivating components or components capable of improving catalyst adhesion; the alloy known as "Fecralloy" may be considered. Suitable ceramics include those based on alumina, alumina-silicate, cordierite, zirconia, zircon-mullite or the like. Alumina appears to be the preferred support for a Rh second stage catalyst. Although metal supports usually do not have significant intrinsic porosity unless in the form of a metal foam, the surface area, and the ability of the support to carry high surface area dispersed catalyst may be improved by a washcoat coating. Suitable washcoats and coating technology are available to those skilled in the art, and may comprise one or more of alumina, zirconia, ceria, alumina-silica, lanthana-alumina and mixtures thereof. It is known from automotive emission control catalysts that the washcoat can contribute not just to catalyst surface area (including stabilising the washcoat at high temperatures), but also to more effective use of the catalyst. Therefore, the washcoat may comprise other components, which are generally one or more metal oxides or mixed metal oxides, especially from the transition metals or rare earth metals.

Shaped supports are conveniently shaped ceramic supports pellets or extrudates, such as cylinders or rings, multi-holed cylinders or multi-lobe supports, or other high surface area, low pressure drop, shaped support. The shaped support may be a high surface area monolith such as a flow-through honeycomb or a foam, or even a ceramic woven or non-woven fabric. A presently preferred support is well known as "Raschig rings", which are desirably highly porous, in suitable sizes, for example 5 to 40 mm diameter. The supports may be impregnated or coated with the chosen catalyst composition.

The second stage catalyst may be used alone or in admixture with non-catalysed materials, or with materials carrying other catalysts. It may be supported (deposited) on a monolithic catalyst support or if particulate, supported on a metal grid, or between metal grids.

There may be an intermediate layer positioned between the first and second stage catalysts. This may be inert, serving as a support for one or both of the catalysts, or may have a function. Functional intermediate layers include those which absorb gas components, or those which convert gas components into products which are inert or relatively innocuous as regards the first stage product or the second stage product, or into product NO or products which are converted into NO, or into products which do not cause undesirable side reactions in the second stage reaction. For example, if the second stage catalyst is sensitive to, e.g. poisoned by, atmospheric components such as sulphur, or other materials found in the gas feedstock (Fe, Se) the intermediate layer may act as an absorber or getter. In this regard, we include herein the teaching of our co-pending United Kingdom patent Application No. 0309747.4.

Other components, such as pre-first stage or post-second stage layers may be incorporated into the catalyst charge or pack, as desired. Such a layers may, as in the case of an intermediate layer, be inert or functional. Functional layers may improve the campaign lifetime or improve the quality of the overall reaction in some aspect. In addition to physical layers in the catalyst charge of the invention, the invention may comprise additional steps, perhaps remote from the catalyst charge itself, which improve efficiency or other aspects of performance. For example, sulphur removal is seen as advantageous for LaCoOxide-type second stage catalysts, and an example of a suitable sulphur removal guard bed comprises lanthana or a similar oxide.

Whilst the first and second stage catalysts are not identical, it is possible to conceive of one or other being supported on a support such as a monolith to which state-of-the-art automotive catalyst coating technology is applied to give a "striped" catalyst, in which bands of different catalytic components are applied to the same monolith. This could, of course, also be used to deposit first and second stage catalysts onto a single monolith, and such a construction should be considered as falling within the present invention.

The present inventors have considered a number of embodiments of catalyst charges etc, all of which should be regarded as being according to the invention, and which are listed below for the assistance of readers. It will be understood that certain of the embodiments may overlap, or may be a sub-set of another, and also that the invention should not be limited to this listing.

Embodiment A. Pt or Pt alloy first stage catalyst plus second stage ammonia oxidation catalyst (which may additionally inhibit $N_2O$ formation or catalytically convert $N_2O$ to relatively innocuous by-products), especially where: (i) the first stage catalyst is a supported Pt or Pt alloy catalyst and the second stage catalyst is Co-based and/or the process of the invention incorporates designed and specified ammonia slip past the first stage catalyst, or (ii) a non-Co-based second stage catalyst in combination with an additional layer or incorporating an $N_2O$ destruction catalyst. Embodiment A(i) may desirably include a first stage catalyst designed to operate to react 90 to 99% of the ammonia in the feed gases, in combination with a second stage catalyst that oxidises the remainder of the ammonia, whilst making low levels of $N_2O$, desirably less than 500 ppm, more desirably less than 200 ppm, of $N_2O$.

Embodiment B. Non-gauze PGM first stage catalyst, for example, where the first stage catalyst is a supported Pt or Pt alloy catalyst, and where the second stage catalyst has high activity for $N_2O$ destruction.

Embodiment C. Pt or Pt alloy first stage catalyst and a supported platinum group metal second stage catalyst.

Embodiment D. Pt or Pt alloy first stage catalyst, an intermediate layer or additional component in the downstream part of the first stage catalyst or the upstream part of the second stage catalyst, especially where the intermediate layer or additional component acts as a guard bed to remove or reduce the effects of sulphur components in combination with the second stage catalyst. The second stage catalyst may suitably be a Co-based perovskite catalyst.

Embodiment E. First and second stage catalysts, optionally with intermediate layers or beds, designed and operated such that the ammonia slip from the first stage is in the range from 20 to 99 wt %, preferably 50 to 70 wt %, and especially where the initial design ammonia slip is negligible and the $N_2O$ content of the second stage product is less than 1600 ppm, preferably less than 500 ppm.

Embodiment F. Pt or Pt alloy first stage catalyst and non-Co-based second stage catalyst, in combination with an $N_2O$ destruction catalyst as a bed/layer downstream of the second stage catalyst or incorporated within the second stage catalyst. For example, the second stage catalyst is a supported platinum group metal catalyst and the $N_2O$ destruction catalyst is a Co-based catalyst. This embodiment, essentially a three-layer system, may prove particularly advantageous for high yield systems and processes.

Embodiment G. First and second stage catalysts in combination with a Pt catchment component, suitably a Pd-based catchment gauze, for example mounted upstream or downstream of the second stage catalyst. We have found surprisingly that while Pd-catchment gauzes may contribute to $N_2O$ production, in the present invention where ammonia slips from the first stage catalyst to the second stage catalyst that the positioning of a Pd-gauze below, i.e. downstream of the second stage catalyst may offer reduced $N_2O$ make compared with the placement of the Pd-catchment between the first and second stage catalyst. It is believed that any Pd-containing gauze will have a Pt catchment effect if placed downstream of a Pt catalyst. However, preferably the catchment gauze contains palladium>10% wt, more preferably >40% wt, especially >70% wt. The Pd-based catchment may comprise minor amounts ($\leqq$10% wt) one or alloying elements, such as Ni, Au, Co etc, and may also contain platinum. A typical catchment gauze is 5% Ni:95% Pd. Preferably the Pd-catchment gauze is formulated to reduce $N_2O$ levels and comprises <5% wt rhodium. Preferred catchment gauzes comprise palladium, platinum and rhodium. Such gauzes may comprise 8-25% wt, preferably 10-20% wt platinum. Examples of suitable catchment gauze materials include >92% wt palladium, 24% wt rhodium and the remainder platinum, or alternatively 82-83% wt palladium, 2.5-3.5% wt rhodium and the remainder platinum.

Embodiment H. First stage catalyst and a second stage catalyst which is platinum group metal coated or an admixture of second stage catalyst with platinum group metal supported catalyst.

Embodiment I. First stage catalyst and second stage catalyst, with an intermediate bed, especially a sulphur-protecting guard bed, and with an additional bed or layer downstream of the second stage catalyst of a specific $N_2O$ destruction catalyst.

Embodiment J. A catalyst charge with a guard bed upstream of the first stage catalyst. The guard bed may especially remove poisons, whether poisons for Pt or poisons for the second stage catalyst. Thus the guard bed may remove materials such as Fe, Si, Cl, Pb, As and S, P etc.

Embodiment K. A first stage catalyst and non-Co-based second stage catalyst, in combination with two downstream beds, especially an $N_2O$ destruction catalyst and a catchment bed. For example, the first stage catalyst, a platinum group metal-based second stage catalyst, a Co-based $N_2O$ destruction catalyst and a Pd gauze catchment gauze.

In general, tests performed in reaching the present invention show that high conversions of $N_2O$ are obtained over about 850° C. (lower with the best second stage catalysts). This indicates that an active first stage catalyst is preferably chosen, and the catalyst is designed and positioned to produce a temperature in the second stage above the light-off temperature for $N_2O$ destruction, suitably of at least 700° C., preferably at least 850° C. Accordingly, it appears desirable to oxidise a high proportion (i.e. >50% by volume) of ammonia in the first stage, to give sufficient exotherm for efficient $N_2O$ destruction in the second stage.

The invention will now be described by reference to working bench-scale examples, small pilot scale examples and a full-scale plant trial example.

EXAMPLE

Example 1

Preparation of Second Stage Catalyst Samples

A. 0.1 wt % Rh was impregnated into commercial porous gamma-alumina Raschig rings (available e.g. from Saint-Gobain Norpro) using conventional catalyst preparation techniques, the samples dried and fired, and the sample crushed and sieved to a particle size range between 250 and 355 microns;

B. A crushed sample of 0.2 wt % Rh on identical rings as in sample A was prepared in analogous manner;

C. A standard washcoating technique was used to apply a powdered 0.5 wt % Rh on alumina catalyst onto highly macroporous alpha-alumina ceramic Raschig rings. The samples were dried, fired and crushed as in Sample A. The final loading of Rh on the coated product was 0.03% by wt.

A single 95%Pt5%Rh knitted gauze was used to catalyse a feed stream of 10% $NH_3$ in air to produce a first stage product comprising NOx, $N_2O$, steam, nitrogen, and unreacted $NH_3$ and oxygen. The first stage product was passed directly into a second reactor containing each of the second stage catalysts A, B and C. The equipment was such that the temperature over the second stage catalyst could be varied in a range from 450 and 800° C., and the composition of the exit stream could be analysed for $N_2O$, with the results shown in accompanying FIG. 1. (Conversion indicates conversion of $N_2O$). Higher conversion is shown for the higher-loaded sample B, compared to sample A, and the lower results for sample C, indicate that a greater quantity would have to be used for comparable results.

Example 2

A large number of tests were performed in a high throughput parallel reactor on a variety of metal or metal oxide catalysts carried on a variety of commercially available and proprietary oxidic supports, including mixed oxide supports, and made in conventional manner. Testing for $N_2O$ decomposition led to the following conclusions:

1. Supported base metal oxide catalysts have low activity, although Ni, preferably Ni on $CeO_2$, was the most active;
2. For PGM catalysts, at equivalent loadings, Pd>Ir>>Ru or Pt;
3. Mixed PGM catalysts offer little to negative benefit over single PGM metal catalysts;
4. Addition of other metals tends to degrade the performance of Rh;
5. The absolute activity of Rh catalysts is support dependent, with alumina or ceria/alumina/zirconia being the best; and
6. At "high" loadings (>5%), Pt and Ru show reasonable activity.

Example 3

The highest activity $N_2O$ destruction catalyst from Example 2, 0.5% Rh on alumina, was compared with a LaCeCo oxide catalyst prepared according to WO 98/28073, in a representative gas comprising NOx, oxygen and water vapour, at various temperatures, both "fresh" and after hydrothermal aging at 1000° C. in air, to represent a used catalyst. The fresh Rh catalyst showed the best performance from about 500° C., reaching 100% conversion at about 800° C., however, even the aged LaCeCo oxide catalyst showed greater than 90% conversion at 900° C.

Example 4

The preferred supported catalysts from the preceding Examples were tested in the laboratory for ammonia oxidation, measuring both conversion to NOx and conversion to $N_2O$. The results are shown in the table below:

From the results below, as regards ammonia oxidation alone (ignoring $N_2O$ destruction activity) the WO 98/28073 LaCeCoOxide demonstrates good ammonia oxidation performance with low $N_2O$ make, better than the supported platinum group metal catalysts tested. The activity of the platinum group metals is the reverse of that for $N_2O$ decomposition, that is:

Pt>Pd>Rh

Pd produces high levels of $N_2O$, because of equal selectivity to NOx and $N_2O$.

| Catalyst | conversion to NOx | Conversion to $N_2O$ | Total |
|---|---|---|---|
| Rh/ceria-zirconia | 52 | 10 | 62 |
| Rh/ceria-zirconia-alumina | 24 | 13 | 37 |
| Rh/zirconia | 34 | 6 | 41 |
| Pt/ceria-zirconia | 42 | 22 | 64 |
| Pt/ceria-zirconia-alumina | 44 | 21 | 64 |
| 10% Pt/alumina | 45 | 22 | 67 |
| Pd/ceria-zirconia | 28 | 25 | 53 |
| LaCeCoOxide | 79 | 10 | 89 |
| Pt on LaCeCoOxide | 71 | 12 | 83 |
| Rh on alumina Raschig | 27 | 22 | 49 |
| Blank Raschig | 38 | 17 | 55 |
| 2Pt1Rh/ceria-zirconia-alumina | 51 | 16 | 67 |

Example 5

A catalyst charge according to the invention, consisting of 6 "Prolok" 95%Pt5%Rh commercial knitted catalyst gauze, available from Johnson Matthey, as first stage catalyst mounted upstream of a 50 mm bed of LaCeCoOxide 3 mm cylindrical pellets according to WO 98/28073 as second stage catalyst ("Invention"), was compared to a bed of identical 6 "Prolok" gauzes ("Comparison"). The tests were run for 30 days in a tubular reactor of 40 mm id, at conditions simulating a commercial ammonia oxidation plant: 200° C. preheat; 10.5% $NH_3$ in air at 4.5 bar absolute pressure, and at feedstock flow rates of 7.7 $m^3$/hr.

Infra-red and UV-vis spectrometry were used to measure [NO], [$NO_2$], and [$N_2O$] concentration in the dried product gas. Infra-red spectrometry was used to measure [$NH_3$] concentration in the gaseous feed. The efficiency of the catalyst was calculated on the basis of the nitrogen balance using the following formula: Efficiency to NOx={[NO]+[$NO_2$]}/[$NH_3$] with a correction for molar volume changes in the reaction.

The following conclusions could be deduced from studying the results:
Light off: Invention very much better than Comparison;
Efficiency: Invention equal to Comparison
$N_2O$ make: Invention order of magnitude better than Comparison
$SO_2$ tolerance: Invention as resistant as Comparison (50 ppb $SO_2$ added from day 24*)
$N_2O$ destruction: 100 ppm added in feed from day 21–invention—all $N_2O$ destroyed; Comparison—negligible destruction
* Typical $SO_2$ levels on a plant may be 5 ppb, so this test gives accelerated effects.

Example 6

A further pair of 30 day runs were carried out under the same conditions as example 5, except ammonia concentration was 10%+/−0.5%, but with the invention charge consisting of 3 Prolok gauzes and a 25 mm depth bed of the same second stage catalyst
Conclusions were:
Light-Off: Invention better than Comparison
Efficiency: Comparison approx 1% better than invention
$N_2O$ make: Invention order of magnitude better than Comparison
$N_2O$ destruction: Days 11, 12 100 ppm $N_2O$ introduced. Invention ~60% destruction, zero destruction with Comparison
$SO_2$ tolerance: No impact on efficiency with either, but $N_2O$ levels with invention rise from base line of 180 ppm to approx 800 ppm over 11 days; no effect on $N_2O$ levels with Comparison
$SO_2$ recovery: Recovery to 700 ppm $N_2O$ levels

Example 7

A further pair of runs were carried out using the same Comparison catalyst on the same equipment using 4 sheets of the Prolok gauze combined with 50 mm bed depth of the same second stage catalyst. Test conditions modelled a different commercial plant: pressure was 10 bar absolute; flow rate was 10 m³/hr; ammonia concentration was 10% and pre-heat temperature was 237° C.
Conclusions were:
Light-off: Invention better than Comparison
Efficiency: Comparison approx 1.5% better than invention
$N_2O$ make: Invention is order of magnitude better than Comparison
$N_2O$ destruction: 100 ppm introduced from day 18; Comparison had no effect, invention destroyed 100%
$SO_2$ tolerance: 50 ppb $SO_2$ introduced on day 19, with no impact on efficiency but $N_2O$ levels slowly increasing.

Example 8

A further pair of runs were carried out over 24 days under the same conditions as example 5, except the Comparison consisted of 1 sheet of Prolok gauze over 5 mm of pelleted alumina and the invention example consisted of 1 sheet of Prolok gauze on 50 mm of the LaCeCoOxide pellets. These configurations demonstrate a considerable reduction in the PGM catalyst loading and a higher level of ammonia slip to the second stage catalyst.
Conclusions were
Efficiency: Invention approx. 12% more efficient than Comparison.
$N_2O$ make: Invention an order of magnitude lower than Comparison
$N_2O$ destruction and $SO_2$ tolerance were not determined.

Example 9

A further pair of runs were carried out according to the method of Example 8, both according to the present invention, wherein 2 sheets of a Pd-catchment comprising a 5% wt Ni—Pd alloy were placed either between the single Prolok sheet and the 50 mm of $LaCeCoO_3$ pellets (arrangement 1) or after (i.e. downstream of) the $LaCeCoO_3$ pellets (arrangement 2).
The conclusions were
Efficiency: Arrangement 2 approx 4% better than arrangement 1
$N_2O$ make: Arrangement 2>1, but both an order of magnitude lower than Comparison
$N_2O$ destruction: not measured
$SO_2$ tolerance: Arrangement 2>1.

Example 10

Ammonia was oxidised with air in a tubular laboratory reactor of 28-mm internal diameter. The reaction conditions were as follows;

| | |
|---|---|
| Flowrate | 3.3 ± 0.1 m³/hr of an air-ammonia mixture |
| Composition | 10.5 ± 0.3% $NH_3$, |
| Preheat Temperature | 203° C. |

The pressure and exit temperatures varied and are given in the table below.
A mass spectrometer was used to analyze the composition of NO, $NO_2$ and $N_2O$ in the product gas, with Ar used as an internal standard. Infra red spectrometry was used to measure [$NH_3$] concentration in the gaseous feed. The efficiency of the catalyst was calculated on the basis of the nitrogen balance using the following formula: Efficiency to NOx={[NO]+[$NO_2$]}/[$NH_3$] with a correction for molar volume changes in the reaction using Ar as an internal standard.
The catalyst arrangements placed in the reactor comprised either:
a) a single ply of 76 μm platinum-rhodium gauze (NitroLok 95:5, available from Johnson Matthey plc) above 50 mm of $La_{0.8}Ce_{0.2}CoO_3$ pellets (3 mm), or
b) a repeat of Example 10a using 2-plies of platinum-rhodium gauze, or
c) a single ply of 76 μm platinum-rhodium gauze above 25 mm of a 0.5% wt Rh on alumina catalyst prepared according to the method of Example 1 or
d) a repeat of example 10c wherein 2 plies of a 95:5 Pd:Ni catchment gauze are placed between the Pt and Rh/$Al_2O_3$ oxidation catalysts.
The tests were performed over 15-21 hours. The results obtained over 3-5 hour periods under steady state conditions are set out in the following table:

| Example | Pressure (bara) | Exit Temp. (° C.) | NOx Efficiency (%) | $N_2O$ Make (ppm) |
|---|---|---|---|---|
| 10a | 5.2 | 838 | 85 | 153 |
| 10b | 5.3 | 831 | 84 | 232 |
| 10c | 5.3 | 896 | 65 | 1209 |
| 10d | 5.7 | 865 | 85 | 1151 |

In comparison, using the same equipment under similar conditions, 4-plies of platinum-rhodium gauze make 2345 ppm $N_2O$ (at an efficiency of 90.0%). Furthermore, 50 mm of pelleted $CuAl_2O_4$ (a nitrous oxide decomposition catalyst) placed under 1 ply platinum-rhodium gauze gives an efficiency of only 58%, with a $N_2O$ make of 278 ppm. Thus the catalyst assemblies of the present invention are able to provide the combination of high efficiency and low $N_2O$ make where the amount of platinum has been markedly reduced resulting in ammonia slip between the first and second stage catalysts.

Example 11

A full-scale plant trial was performed using a catalyst assembly comprising a first stage catalyst consisting of 6 gauzes of Pt:Rh 92:8 (available commercially as Nitrolok 800 and Nitrolok 760 from Johnson Matthey PLC), 4 gauzes of Pt:Rh 95:5 (available commercially as Prolok 750 from Johnson Matthey PLC) and 1 gauze of Pt: Rh:Pd 90:5:5 (available commercially as Nitrolok 820 from Johnson Matthey PLC), having a total weight of 24.25 kg, and a second stage catalyst consisting of a 100 mm deep bed of pelleted $La_{1-x}Ce_xCoO_3$ prepared according to WO 98/28073 in the form of 4-holed pellets, weighing 480 kg.

The plant operating parameters were as follows:

| Operating condition | Value | Units |
|---|---|---|
| Plant capacity | 750 | Metric Tonnes per day of 100% $HNO_3$ |
| Air flow (before catalyst) | 132321 | $Nm^3$/hour |
| Ammonia Ratio | 10.5 | Mol % $((NH_3)/(NH_3 + Air))$ |
| Preheat temperature | 237 | °C. |
| Operating Pressure | 10.0 | Bara |
| Catalyst Temperature | 920 | °C. |
| Burner Diameter (at catalyst) | 1.94 | Metres |

The results were as follows;
Start Efficiency 94%, which is comparable to the single stage Pt gauze-only process typically used.
End Efficiency 90% (at be 90 days, the design campaign length): Average Efficiency 92% (at 90 days).
Mean $N_2O$ in flue gas, according to the invention 154 ppm, compared to 463 ppm for a single stage Pt gauze-only process. Thus the present invention has reduced the $N_2O$ made by >50%. The single-stage Pt gauze-only process requires an extra 15 kg of platinum catalyst indicating that the present invention offers considerable savings in platinum to the catalyst assembly. The actual trial duration was 112 days compared to design of 90 days (average efficiency at 112 days was 91%). Thus the present invention offered a >20% increase in campaign length. Inspection of the gauzes after the trial indicated that the ammonia was slipping from the first stage catalyst onto the cobalt catalyst. By calculation of the weight loss from the platinum catalysts it was established that 29.3% of the overall ammonia oxidation happened over the $La_{1-x}Ce_xCoO_3$ catalyst.

The invention claimed is:

1. A process for the oxidation of ammonia comprising passing a feed gas comprising a mixture of a source of ammonia together with a source of oxygen over a catalyst, and operating at a temperature from 700 to 1000° C., wherein the feed gas is passed over a first stage catalyst for ammonia oxidation comprising a high surface area platinum group metal catalyst to achieve a conversion of 20 to 99% of the ammonia and yield a first stage product comprising nitrogen oxides, oxygen and unreacted ammonia, and then passing the first stage product over a second stage catalyst for ammonia oxidation, to complete ammonia oxidation, wherein the second stage catalyst is also effective as a $N_2O$ destruction catalyst, and yield a second stage product comprising negligible amounts of unreacted ammonia and $N_2O$ present in an amount of less than 500 ppm wherein the second stage catalyst comprises pellets or extrudates of a catalyst selected from the group consisting of $LaCoO_3$ in which partial substitution up to 20 mole % of the La has been made by Sr or Ce, or partial substitution up to 50 mole % of the Co has been made by Cu; $Co_3O_4$ supported on alumina, thoria, ceria, zinc oxide or calcium oxide; and $Co_3O_4$ promoted by rare earth elements or thorium.

2. A process according to claim 1, operated to establish a temperature in the second stage of not less than 700° C.

3. A process according to claim 1, wherein an ammonia slip past the first stage catalyst is greater than 25% vol.

4. A process according to claim 1, comprising using one or more additional stages selected from the group consisting of absorbing or converting catalyst poisons to an innocuous form, absorbing or collecting platinum displaced from the first stage catalyst, and catalytically decomposing $N_2O$ present in the second stage product.

5. A process according to claim 1, wherein the second stage catalyst is effective to destroy greater than 80% of $N_2O$ at a temperature within the second stage.

6. A process according to claim 1, wherein the second stage catalyst is effective to destroy greater than 90% of $N_2O$ at a temperature within the second stage.

7. A process according to claim 4, wherein a palladium-containing catchment gauze is placed between the first and second stage catalysts.

8. A process according to claim 7, wherein the catchment gauze comprises less than 5% wt rhodium.

9. A process according to claim 1 wherein the second stage catalyst is $LaCoO_3$ in which partial substitution up to 20 mole % of the La has been made by Sr or Ce.

10. A process according to claim 1 wherein the conversion of the ammonia over the first stage catalyst is in the range 50 to 70%.

11. A process according to claim 1 wherein the conversion of the ammonia over the first stage catalyst is in the range 85 to 95%.

12. A process according to claim 1 including the Andrussow process for the production of hydrogen cyanide.

13. A process according to claim 1, wherein the $N_2O$ amount in the second stage product is between 100 ppm to less than 500 ppm.

* * * * *